(12) United States Patent
Yang et al.

(10) Patent No.: US 10,766,703 B2
(45) Date of Patent: Sep. 8, 2020

(54) CONVEYOR BELT PULLEY COVER COMBINING LOW ROLLING RESISTANCE WITH ENHANCED OZONE RESISTANCE

(71) Applicant: ContiTech USA, Inc., Fairlawn, OH (US)

(72) Inventors: Heng-Huey Yang, Copley, OH (US); Thomas George Burrowes, North Canton, OH (US); Guangzhuo Rong, Hudson, OH (US)

(73) Assignee: ContiTech USA, Inc., Fairlawn, OH (US)

( * ) Notice: Subject to any disclaimer, the term of this patent is extended or adjusted under 35 U.S.C. 154(b) by 0 days.

(21) Appl. No.: 16/373,700

(22) Filed: Apr. 3, 2019

(65) Prior Publication Data

US 2019/0225424 A1    Jul. 25, 2019

Related U.S. Application Data

(63) Continuation-in-part of application No. 15/746,000, filed on Jan. 19, 2018, now Pat. No. 10,266,345, and
(Continued)

(51) Int. Cl.
*B65G 15/32* (2006.01)
*C08L 7/00* (2006.01)
(Continued)

(52) U.S. Cl.
CPC .............. *B65G 15/32* (2013.01); *B32B 25/04* (2013.01); *B32B 25/12* (2013.01); *B65G 15/00* (2013.01);
(Continued)

(58) Field of Classification Search
None
See application file for complete search history.

(56) References Cited

U.S. PATENT DOCUMENTS 3,451,962 A * 6/1969 Auler ...................... C08L 91/00
524/526
3,557,028 A    1/1971 Turk
(Continued)

FOREIGN PATENT DOCUMENTS

CN        1206026 A    1/1999
CN      101428705 A    5/2009
(Continued)

*Primary Examiner* — William R Harp
(74) *Attorney, Agent, or Firm* — David L. Cate; Gregory Adams

(57) ABSTRACT

Conveyor belts having an outer cover layer, an opposing inner cover layer, and a carcass disposed between the outer and inner cover layers. The outer cover layer includes a sulfur cured rubber formulation formed from a blend including from about 20 phr to about 40 phr of an EPDM elastomer, from about 1 phr to about 40 phr of a polybutadiene rubber, and from about 30 phr to about 80 phr of a natural rubber. The sulfur cured rubber formulation may include a sulfur curative in an amount of from about 1.0 phr to about 4.0 phr. The sulfur cured rubber formulation may exhibits no cracking under dynamic ozone testing conditions of 50 pphm ozone, 25% strain, and 40 deg C., at 168 hours, in accordance with ASTM D1149, and may have a rolling resistance factor value of from 0.05 to 0.06 at a temperature of 25 deg C.

18 Claims, 3 Drawing Sheets

Related U.S. Application Data a continuation of application No. PCT/US2016/039987, filed on Jun. 29, 2016.

(51) Int. Cl.
  *C08L 9/00* (2006.01)
  *B32B 25/12* (2006.01)
  *B32B 25/04* (2006.01)
  *B65G 15/00* (2006.01)

(52) U.S. Cl.
  CPC .................. *C08L 7/00* (2013.01); *C08L 9/00* (2013.01); *B32B 2433/02* (2013.01); *C08L 2205/03* (2013.01); *C08L 2205/035* (2013.01)

(56) References Cited

U.S. PATENT DOCUMENTS

| | | | |
|---|---|---|---|
| 3,595,950 A | 7/1971 | Mezynski | |
| 3,678,135 A | 7/1972 | Mastromatteo et al. | |
| 4,645,793 A * | 2/1987 | Von Hellens | C08L 21/00 |
| | | | 152/525 |
| 4,674,622 A | 6/1987 | Tadashi et al. | |
| 4,794,134 A | 12/1988 | Wheeler et al. | |
| 5,120,779 A | 6/1992 | Cornell et al. | |
| 5,511,652 A * | 4/1996 | McGinnis | B65G 15/08 |
| | | | 198/690.2 |
| 5,714,022 A | 2/1998 | Nagao | |
| 6,300,421 B1 | 10/2001 | Blok et al. | |
| 6,393,655 B1 | 5/2002 | Dailey | |
| 6,540,069 B2 | 4/2003 | Tschantz | |
| 6,737,461 B2 * | 5/2004 | Hannay | C08K 3/26 |
| | | | 474/191 |
| 6,800,691 B2 | 10/2004 | Graf | |
| 9,463,930 B2 * | 10/2016 | Minkin | B65G 15/40 |
| 9,580,249 B2 * | 2/2017 | Si | B65G 15/36 |
| 2002/0045697 A1 * | 4/2002 | Sohnen | C08K 5/01 |
| | | | 524/492 |
| 2004/0129358 A1 | 7/2004 | Ernst et al. | |
| 2007/0155889 A1 | 7/2007 | Okamoto | |
| 2017/0361653 A1 | 12/2017 | Saintigny | |
| 2019/0367717 A1 * | 12/2019 | Xu | C08K 5/14 |

FOREIGN PATENT DOCUMENTS

| | | |
|---|---|---|
| CN | 104151721 A | 11/2014 |
| CN | 104194100 A | 12/2014 |
| CN | 104672627 A | 6/2015 |
| EP | 1033386 A1 | 9/2000 |
| EP | 2803698 A1 | 11/2014 |
| EP | 2883714 A1 | 6/2015 |
| JP | 2001181456 A | 7/2001 |
| JP | 2014190373 A | 10/2014 |

* cited by examiner

CONVEYOR BELT PULLEY COVER COMBINING LOW ROLLING RESISTANCE WITH ENHANCED OZONE RESISTANCE

RELATED APPLICATION INFORMATION

This Patent Application is a Continuation-In-Part Application of, and claims priority to, U.S. Nonprovisional patent application Ser. No. 15/746,000 filed Jan. 19, 2018 as a National Stage Entry of PCT/US2016/039987, filed Jun. 29, 2016, which is incorporated herein in its entirety, by reference. This Patent Application also claims priority to U.S. Provisional Patent Application No. 62/198,759 filed Jul. 30, 2015, which is incorporated herein in its entirety, by reference.

FIELD

The field to which the disclosure generally relates is conveyor belts, and more particularly to improved carry cover layers and/or pulley cover layers for conveyor belts.

BACKGROUND

This section provides background information to facilitate a better understanding of the various aspects of the disclosure. It should be understood that the statements in this section of this document are to be read in this light, and not as admissions of prior art.

In a multitude of commercial applications, it is common to employ conveyor belts for the purpose of transporting products and materials. Such conveyor belts can serve in applications which have minimal demands, moderate demands, or in applications which are extremely demanding and which require heavy-duty conveyor belts. Conveyor belts can also vary greatly in size and length. For instance, the conveyor belts used in mining applications can be up to about three meters wide and very long, for example, on the order of many kilometers. They can also be up to about 8 centimeters thick, or even thicker. In any case, heavy-duty conveyor belts are widely used for moving minerals, coal, agricultural products, and a wide variety of manufactured products from one point to another. For instance, heavy-duty conveyor belts are often used in typical mining applications to transport minerals below the ground, to above the surface, and ultimately above ground to a desired location for processing and/or ultimately for transportation on rail road cars, trucks, barges, or ships.

Conveyor belts are also widely used in a wide variety of applications which have only moderate or even light demands. For instance, conveyor belts are commonly used in conveying groceries and household items at the check-out lanes of grocery stores and supermarkets. Conveyor belts of this type are frequently used for many hours of every day and can be subjected to user abuse caused by spills and contact with items having sharp edges which can cut the surface of the belt. Accordingly, high demands are frequently put on such belts even though the items being conveyed in such applications are normally light and non-abrasive in character. In applications of this type where consumers are using and seeing the conveyor belt it is also important for the conveyor belt to maintain an aesthetically good appearance throughout its service life.

Pipe conveyors, also referred to as tube conveyors or pipe conveyors, are conveyor belts which are loaded with a material to be conveyed and after being loaded are closed into the conformation of a tube by mechanical means to force the conveyor into a closed tube by overlapping the belt edges. After being closed into the form of a tube the material being conveyed is protected from external elements and is also contained within the tube to in help prevent loss of the material being conveyed. In any case, a plurality of support and guide assemblies for the conveyor are situated along the conveyor path to open and close the conveyor as desired at different points along the path of the conveyor. Each assembly includes a plurality of support and guide rollers, which contact and hold the pipe conveyor belt while in operation.

Pipe belts are predominantly employed where bulk material is conveyed in a relatively confined space through horizontal and vertical curves. By virtue of their special adaptability to various topographical conditions, pipe belt conveyor systems are also used for conveying material over distances longer than 1 kilometer. The advantages offered by pipe belts include protection of the transported material against environmental influences (rain, wind, etc.) and protection of the environment against material dropping from the conveyor belt (ashes from power plants, gypsum, etc.). In some cases pipe belts also protect the material being transported from theft by employees and third parties that may be present in the area through which the material is being conveyed.

Pipe conveyor belts are flexed by opening and closing during every cycle of operation to allow for the material being conveyed to be loaded and unloaded from the belt. This opening and closing action subjects the pipe belt to a substantial amount of repeated flexing which is encountered even during normal operations. In addition to this, pipe belts are prone to running off course or twisting under certain operating conditions. Belts may twist because of uneven loading, uneven guidance through curves, or otherwise poorly aligned systems. For this reason, support and guide rollers are optimally designed to provide for trouble-free and low maintenance operation as the pipe belt travels through the conveyor system. The rollers are individually aligned depending upon the course that the conveyor system is running. The functionality of the rollers is influenced by varying weather and temperature conditions, wear, and design defects. For example, moisture reduces friction between the rollers and the conveyor belt, which results in guidance that is not optimal. If the pipe conveyor belt is misaligned or twisted, for example as it is running up on an ejecting drum, the conveyor belt can fold or even run off of the drum sideways. During any of these adverse operating conditions the pipe belt can be subjected to even more flexing.

In any case, all conveyor belts are flexed during normal operation and can be flexed to an even greater degree during periods of abnormal operation or when being abused. It is accordingly important for conveyor belts to exhibit a high degree of flex fatigue and dynamic ozone resistance to provide a long service life and to maintain an aesthetically good appearance and optimal functionality. For instance, the aesthetic appearance of a conveyor belt can be quickly destroyed by surface cracking that results from insufficient flex fatigue resistance and dynamic ozone resistance in the outer cover layer of the belt.

Conveyor belts are typically comprised of a polymeric material which has an adequate combination of strength and flexibility to meet the needs demanded in the particular application where the belt will be used. For instance, conveyor belts are commonly comprised of a cured rubber or multiple layers of various cured rubbers. Such conveyor belts also frequently include one or more layers of reinforcement which provide the belt with additional strength and durability. The reinforcement can be comprised of a polymeric fabric or metal reinforcements, such as steel reinforcements.

Conventional conveyor belts which are used in heavy duty applications are typically comprised of a cured rubber as a top layer (the carry cover layer), a cured rubber as a bottom layer (the pulley cover layer), and a reinforcement layer which is situated between the top layer and the bottom layer. The prominent material used in such conveyor belts generally is a moderately flexible elastomeric or rubber-like material, and the belt is typically reinforced by a plurality of longitudinally extending steel cables or cords which are positioned within the belt and extend along the length thereof.

Surface cracking due to inadequate flex fatigue and dynamic ozone resistance is a problem that continues to persist in virtually all types of conveyor belts. It is a particularly difficult problem in pipe belts due to the degree of flexing which they encounter during normal use and which can be aggravated during abnormal operation. Even though surface cracking in the pulley layer of many types of conveyor belts is a long standing problem, a means to eliminate it has proven to be elusive.

In addition, modern belt systems are being designed to convey materials over ever increasing distances from the feed point to discharge, so energy consumption of the total system is now being considered. Low rolling resistant covers as used in standard troughed belts have been evaluated for long pipe belt applications to reduce energy consumption but have not addressed the early pulley cover cracking issue. Since modern belt systems may include many tight curves & sharp inclines, the pulley cover early cracking is further exacerbated.

There has accordingly been a long felt need for conveyor belts having better flex fatigue, dynamic ozone resistance and sufficiently low rolling resistance in their cover layer to provide longer service life without encountering surface cracking.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Some embodiments according to the disclosure are conveyor belts having an outer cover layer, an opposing inner cover layer, and a carcass layer disposed between the outer cover layer and the inner cover layer. The outer cover layer includes a sulfur cured rubber formulation formed from a blend including from about 20 phr to about 40 phr of an EPDM elastomer, from about 1 phr to about 40 phr of a polybutadiene rubber, and from about 30 phr to about 80 phr of a natural rubber. In some aspects, the sulfur cured rubber formulation is formed from a blend including of from about 25 phr to about 35 phr of the EPDM elastomer, from about 20 phr to about 30 phr of the polybutadiene rubber, and from about 40 phr to about 50 phr of the natural rubber. In some cases, the sulfur cured rubber formulation includes a sulfur curative in an amount of from about 1.0 phr to about 4.0 phr, or even from about 1.0 phr to about 2.0 phr. In some embodiments, the sulfur cured rubber formulation further includes paraffinic wax in an amount of from about 0.75 phr to about 1.5 phr. The conveyor belt may, in some cases, be a pipe conveyor belt.

In some aspects, the sulfur cured rubber formulation exhibits no cracking under dynamic ozone testing conditions of 50 pphm ozone, 25% strain, and 40 deg C., at 168 hours, in accordance with ASTM D1149. In some other aspects, the sulfur cured rubber formulation has a rolling resistance factor value of from 0.05 to 0.06 at a temperature of 25 deg C.

Some other embodiments according to the disclosure also provide pipe conveyor belts having an outer cover layer, an opposing inner cover layer, and a carcass layer disposed between the outer cover layer and the inner cover layer, where the outer cover layer includes a sulfur cured rubber formulation formed of a blend including from about 25 phr to about 35 phr of an EPDM elastomer, from about 10 phr to about 30 phr of a polybutadiene rubber, and from about 40 phr to about 50 phr of a natural rubber. The sulfur cured rubber formulation exhibits no cracking under dynamic ozone testing conditions of 50 pphm ozone, 25% strain, and 40 deg C., in accordance with ASTM D1149, and has a rolling resistance factor value of from 0.05 to 0.06 at a temperature of 25 deg C.

Yet other embodiments are curable rubber formulations including a blend of from about 20 phr to about 40 phr of an EPDM elastomer, from about 10 phr to about 40 phr of a polybutadiene rubber, from about 30 phr to about 60 phr of a natural rubber, and a sulfur curative. In some aspects, the blend includes from about 25 phr to about 35 phr of the EPDM elastomer, from about 20 phr to about 30 phr of the polybutadiene rubber, and from about 40 phr to about 50 phr of the natural rubber. In some cases, the formulation includes the sulfur curative in an amount of from about 1.0 phr to about 4.0 phr. In some alternate embodiments, the formulation further includes paraffinic wax in an amount of from about 0.75 phr to about 1.5 phr. In some aspects, the sulfur curative is a sulfur donor/accelerator material, while in other aspects, the sulfur curative is free sulfur.

According to some other aspects, the curable rubber formulation, after being cured, exhibits no cracking under dynamic ozone testing conditions of 50 pphm ozone, 25% strain, and 40 deg C., 168 hours, in accordance with ASTM D1149, and may also have a rolling resistance factor value of from 0.05 to 0.06 at a temperature of 25 deg C.

BRIEF DESCRIPTION OF DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
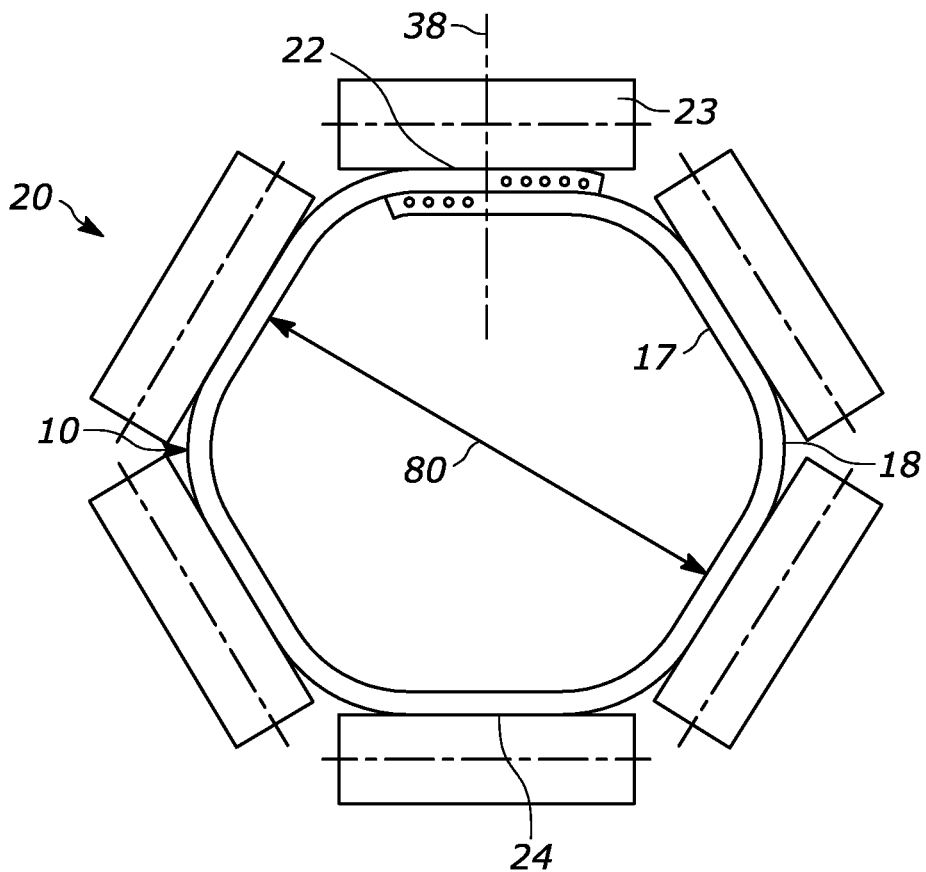
FIG. 1 is a cross sectional view of a pipe conveyor belt assembly according to an aspect of the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

Some embodiments according to the disclosure address early cracking observed in many pipe conveyor belts after a relatively short time in service while maintaining minimal rolling resistance. By incorporating an ethylene-propylene-diene monomer (EPDM) elastomer with a natural rubber and polybutadiene blend, optimal compounds are possible having equivalent low rolling resistance along with significantly enhanced resistance to ozone when tested in a dynamic flex test at high maximum strain. An additional benefit from this composition is increase in dynamic modulus (indicator of improved damage resistance) compared to a baseline low rolling resistance compound without EPDM elastomer. As a further benefit, including the EPDM elastomer in the natural rubber and polybutadiene blend significantly lowered rolling resistance at temperatures below −30 deg C. Overall embodiments according to the disclosure are a novel development that addresses several major shortcomings in current pipe belt pulley covers, as well as providing additional benefits.

Although significant beneficial enhancements are obtained in several key properties of pipe belt pulley covers, this is achieved without change to the mixing & downstream processing behavior relative to current low rolling resistance compounds, standard physical properties are not compromised & compound material cost is not significantly increased. Also, there is no impact on cure characteristics of the belt when using the new compound as it still utilizes a conventional sulfur-based cure system. Embodiments of the disclosure may also be useful in products used in dynamic applications where resistance to ozone attack and low dynamic heat build-up might be of value.

Rubber formulations according to the disclosure include adding EPDM elastomer to a blend of natural rubber and polybutadiene rubber which are co-cured with a sulfur based cure system. These formulations will typically contain from about 20 phr to about 40 phr of EPDM elastomer, from about 1 phr to about 40 phr of polybutadiene rubber, and from about 30 phr to about 80 phr of the natural rubber. In some aspects, the formulations contain from about 25 phr to about 35 phr of EPDM elastomer, from about 20 phr to about 30 phr of polybutadiene rubber, and from about 40 phr to about 50 phr of the natural rubber. These rubber formulations may further contain synthetic polyisoprene rubber for improved tear resistance, nitrile rubber or polychloroprene rubber for improved oil and chemical resistance. These rubber formulations may also contain conventional reinforcing fillers, such as carbon black(s) at levels within the range of about 30 phr to about 50 phr, and conventional rubber compounding ingredients, such as antioxidants, antiozonants, curatives, cure accelerators, cure retarders, processing aids, processing oils, flame retardants, waxes and the like.

In embodiments, the rubber formulations according to the disclosure include EPDM elastomer having a suitable amount of diene functional monomer as a component of the EPDM elastomer. The EPDM elastomer is generally a terpolymer of ethylene, propylene, and diene functional monomers. In some aspects, the EPDM elastomer from about 2.5% to about 12% weight of diene functional monomer, and in some other aspects, at least 6% by weight of diene functional monomer.

According to some aspects of the disclosure, co-curing the EPDM elastomer with the natural rubber and polybutadiene blend with a sulfur based curative provides cured rubber formations with improved dynamic ozone resistance and low rolling resistance. In some cases, the rubber formulation will typically be cured with up to about 4.0 phr of the sulfur curative, and may typically be cured with about 1.0 phr to about 2.0 phr of the sulfur curative.

In some aspects of the disclosure, the sulfur curative is free sulfur, while in some other aspects, the sulfur curative is a sulfur donor/accelerator. The sulfur donor/accelerators which can be utilized according to the disclosure, include but are not necessarily limited to, 2-morpholinodithio benzothiazole, tetramethylthiuram disulfide (also referred to as Methyl Tuads), tetraethylthiuram disulfide (also referred to as Ethyl Tuads), dipentamethylenethiuram tetrasulfide, dimorpholino disulfide, dipentamethylene thiuram hexasulfide, n-butylthiuram disulfide, tetrabenzylthiuram disulfide, tetraisobutyl thiuram disulfide, tetraethylthiuram disulfide, N-oxydiethylenethiocarbamyl-N-oxydiethylene, dimethyl diphenyl thiuram disulfide, and the like. In many cases the sulfur donor/accelerator will be a thiuram ultra accelerator, such as a tetralkylthiuram disulfide. The sulfur donor/accelerator can also be a dialkyldithiophosphate polysulfide.

The cured compound according to the disclosure are of particular value when used as layer(s) of conveyor belts, such as pipe conveyor belts. More particularly they can be valuably utilized in the pulley cover layer of the conveyor belts to provide a higher level of dynamic ozone resistance, as well as low rolling resistance. They are of utmost value for use in pipe conveyor belts, such as the pipe conveyor belts described in U.S. Pat. No. 7,942,259. The teachings of U.S. Pat. No. 7,942,259 are incorporated by reference herein for the purpose of describing pipe conveyor belts into which the rubber formulations of the disclosure can be utilized. In any case, the pipe conveyor belts according to the disclosure have an elastomeric body with a load carrying surface located on the top surface, or internal surface rolled within the elastomeric body. The pipe conveyor belts according to the disclosure will have a width, a length, a longitudinal centerline, a first longitudinal edge, an opposing second longitudinal edge, and a load bearing region. The elastomeric body will normally include plies of fabric or reinforcing steel cables that typically run longitudinally within the pipe conveyor belt. During use, the first longitudinal edge and the second longitudinal edge can overlap to form an overlap region forming the belt into a tube-like shape. The load bearing region is located substantially evenly about the belt longitudinal centerline throughout the length of the belt. In practice the pulley cover layer of the pipe conveyor belt contains cured rubber compositions according to the disclosure.

Figure 2:
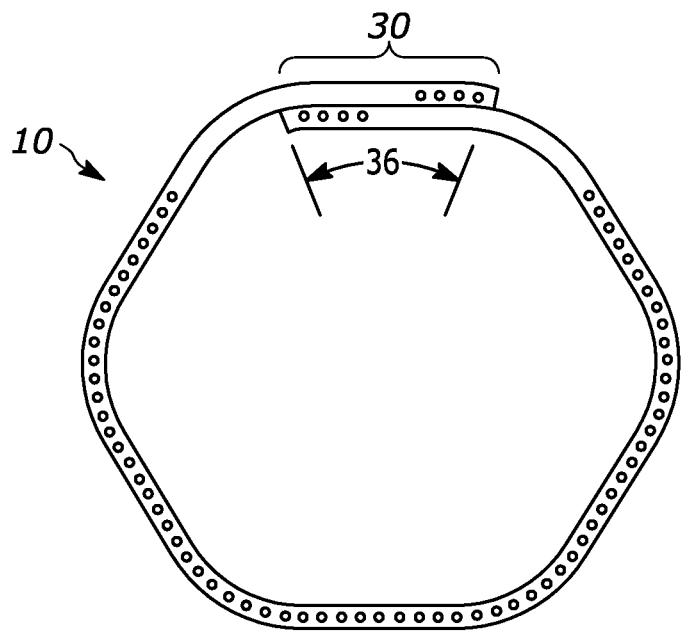
FIG. 2 is a cross sectional view of a pipe conveyor belt according to an aspect of the disclosure.
Figure 3:
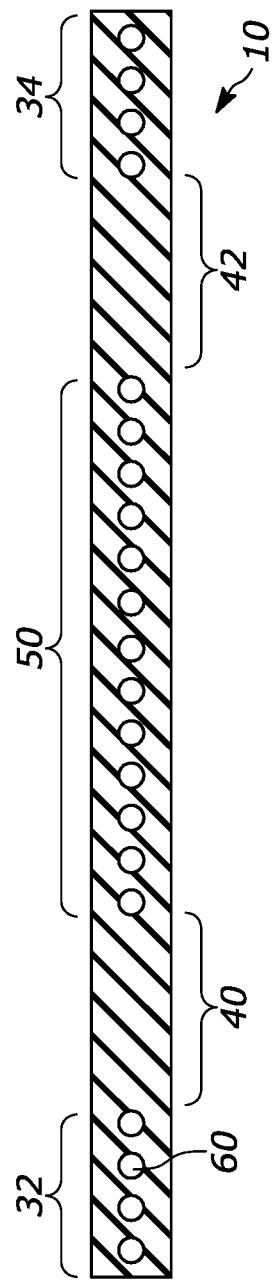
FIG. 3 is a cross sectional view of a pipe conveyor belt according to an aspect of the disclosure.

Now referencing FIG. 1 which illustrates a pipe conveyor belt system 20 in a cross sectional view according to the disclosure where the pipe conveyor belt 10 is forced to move in the desired direction (up, down, through turns, and the like) by a series of idler rolls 23 which are positioned around the belt 10. The idler rolls 23 are also positioned around the belt to hold it in a "closed" pipe conformation in conveying zones and allow it to "open" in loading zones and in discharge areas. During use, it is desired to have the overlap region 30 (shown in FIG. 2) at the top 22 of the system, and the load bearing region 50 (shown in FIG. 3) at the bottom 24 of the system. Thus, the longitudinal reinforcement members 60 in the load bearing region 50 can work to carry the material being conveyed, and the seal in the overlap region maintains the conveyed material within the belt system.

Figure 4:
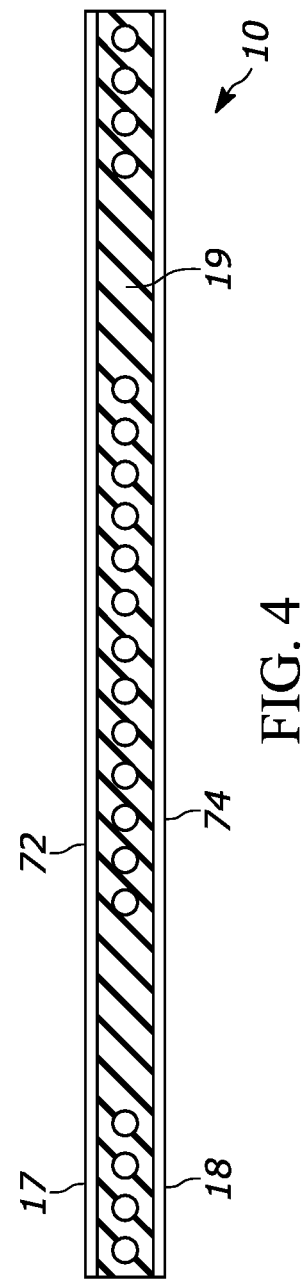
FIG. 4 is a cross sectional view of a pipe conveyor belt according to an aspect of the disclosure; and, FIG. 5 is a plot of rolling resistance factor versus temperature of the rubber formulations studied in the examples.

With reference to FIG. 4, the belt 10 has an inner cover layer 17, and an outer cover layer 18. Rubber formulation embodiments according to the disclosure are useful in forming the outer layer 18, also commonly referred to as pulley cover of the belt.

In a further aspect of the invention, the belt 10 can optionally further include an inner fabric reinforcement layer 72 upon or within the inner cover layer 17. The amount of coverage of the fabric reinforcement layers 74 and/or 72 may be adjusted on a case by case basis to adjust the overall stiffness of the belt to accommodate various operating conditions, such as the ultimate diameter 80 of the tube-like shape, and/or the number and tightness of the bends in the conveying system.

In addition to the pipe conveyor belts described above, rubber formulation embodiments according to the disclosure may be used in other rubber articles to provide like benefits, such as other types of conveyor belts, rubber tracks, power transmission drive belts, other high flex products where early cracking must be eliminated, and the like.

Embodiments of the disclosure illustrated by the following examples that are merely for the purpose of illustration and are not to be regarded as limiting the scope of the disclosure, or the manner in which it can be practiced.

Examples 1-7

In this experiment a series of rubber formulations were prepared, cured and tested for physical properties. In the procedure used, non-productive rubber formulations were prepared utilizing the ingredients identified in Table 1. Then productive rubber formulations were made by further adding the ingredients identified in Table 1 to the non-productive formulations. The quantities reported in Table 1 are in phr.

The productive rubber formulations were subsequently cured at 150 deg C. for 25 minutes, and then tested for physical properties in accordance with ASTM D412 Standard Test Methods for Vulcanized Rubber and Thermoplastic Elastomers. The cured rubber formulations were determined to have the original and oven aged cure characteristics and physical properties delineated in Table 2. Rolling Resistance Factor (RRF) was determined by the formula of Tan Delta/$(E')^{1/3}$ where E' is storage modulus. The rating system used for the dynamic ozone exposure was as follows:

| Number of Cracks | Size of Cracks |
|---|---|
| A = Very few (Less than ¼ surface) | 0 = No cracking |
| B = Few (¼ to ½ of surface) | 1 = Small (hairline) |
| C = Moderate (½ to ¾ of surface) | 2 = Medium |
| D = Heavy (¾ to all of surface) | 3 = Large |
| F = Complete failure (break) | 4 = Severe |

All example formulations tested showed acceptable physical properties for viscosity, elongation, modulus, rolling resistance factor, and tear strength. Examples 2 through 7 are formulations according to the disclosure, while example 1 did not include EPDM elastomer. Comparing examples 2 through 7 shows significant improvement in abrasion resistance over example 1. Examples 3, 6 and 7 showed no cracking (rating "0") even after 168 hrs of ozone exposure (50 pphm, 25%, 40 deg C.) in accordance with ASTM D1149, while example 1 failed after only 24 hrs with heavy cracking (D1).

TABLE 1

| Ingredient | Ex. 1 | Ex. 2 | Ex. 3 | Ex. 4 | Ex. 5 | Ex. 6 | Ex. 7 |
|---|---|---|---|---|---|---|---|
| Non-Productive Blend | | | | | | | |
| Budene 1207$^a$ | 40 | 10 | 20 | 30 | 40 | 30 | 20 |
| Natural Rubber | 60 | 60 | 50 | 40 | 30 | 40 | 50 |
| Roylene 509$^b$ | 0 | 30 | 30 | 30 | 30 | 30 | 30 |

TABLE 1-continued

| Ingredient | Ex. 1 | Ex. 2 | Ex. 3 | Ex. 4 | Ex. 5 | Ex. 6 | Ex. 7 |
|---|---|---|---|---|---|---|---|
| N330 Carbon Black | 35 | 35 | 35 | 35 | 35 | 32.5 | 32.5 |
| N550 Carbon Black | 12 | 12 | 12 | 12 | 12 | 10 | 10 |
| Zinc oxide | 3 | 3 | 3 | 3 | 3 | 3 | 3 |
| 6PPD antiozonant | 2 | 2 | 2 | 2 | 2 | 2 | 2 |
| TMQ antioxidant | 1 | 1 | 1 | 1 | 1 | 1 | 1 |
| Stearic Acid | 2 | 2 | 2 | 2 | 2 | 2 | 2 |
| Paraffinic Wax | 1.5 | 1.5 | 1.5 | 1.5 | 1.5 | 1.5 | 1.5 |
| Productive Blend | | | | | | | |
| TBBS accelerator | 1.3 | 1.3 | 1.3 | 1.3 | 1.3 | 1.3 | 1.3 |
| PVI retarder | 0.15 | 0.15 | 0.15 | 0.15 | 0.15 | 0.15 | 0.15 |
| Sulfur | 1.6 | 1.6 | 1.6 | 1.6 | 1.6 | 1.6 | 1.6 |
| PHR Running Total: | 159.55 | 159.55 | 159.55 | 159.55 | 159.55 | 155.05 | 155.05 |

[a] Polybutadiene
[b] EPDM elastomer

TABLE 2

| Test | Ex 1 | Ex 2 | Ex 3 | Ex 4 | Ex 5 | Ex 6 | Ex 7 |
|---|---|---|---|---|---|---|---|
| Tensile (Mpa) | 23.3 | 22.4 | 20.5 | 18.0 | 17.1 | 19.6 | 20.8 |
| Elongation (%) | 428 | 469 | 437 | 377 | 374 | 453 | 456 |
| Mod 100 (MPa) | 3.2 | 3.8 | 3.9 | 3.9 | 3.7 | 3.3 | 3.5 |
| Mod 300 (Mpa) | 14.6 | 14.1 | 14.0 | 14.1 | 13.5 | 12.2 | 12.8 |
| Shore A Hardness | 64 | 69 | 70 | 71 | 70 | 68 | 68 |
| Die C Tear (N/mm) | 42.1 | 41.4 | 41.1 | 38.1 | 33.5 | 36.8 | 37.9 |
| DIN Abrasion (mm3) | 86 | 128 | 112 | 105 | 93 | 103 | 106 |
| RSA-G2, 1%, 25 deg C. | | | | | | | |
| E' (Mpa) | 8.5 | 13.9 | 13.4 | 13.8 | 13.4 | 11.6 | 12.4 |
| Tan Delta | 0.1085 | 0.1449 | 0.1343 | 0.1356 | 0.132 | 0.1178 | 0.1204 |
| RRF | 0.0532 | 0.0603 | 0.0565 | 0.0565 | 0.0556 | 0.0520 | 0.0520 |
| RRF Index | 100 | 113 | 106 | 106 | 105 | 98 | 98 |
| Dynamic Ozone (50 pphm, 25%, 40 deg C.) ASTM D1149 | | | | | | | |
| 24 hr | D1 | | | | | | |
| 168 hr | | | 0 | | | 0 | 0 |
| Rheometer @ 150 deg C. | | | | | | | |
| Min (dMn) | 5.332 | 5.276 | 5.587 | 5.949 | 6.109 | 5.494 | 5.418 |
| Max (dMn) | 34.23 | 32.83 | 29.92 | 28.59 | 30.27 | 28.72 | 29.19 |
| T90 (min) | 14.44 | 12.63 | 11.8 | 12.77 | 16.61 | 13.37 | 12.25 |
| Mooney Scorch @ 121 deg C. | | | | | | | |
| Initial (MU) | 37.9 | 44.8 | 46.8 | 49.3 | 51.5 | 44.9 | 44.8 |
| ML (MU) | 30.5 | 31.4 | 32.4 | 34.5 | 34.7 | 31.7 | 31.3 |

Examples 8-11

Similar to that described above, in this second experiment a series of rubber formulations were prepared, cured and tested for physical properties. In the procedure used, non-productive rubber formulations were prepared utilizing the ingredients identified in Table 3. Then productive rubber formulations were made by further adding the ingredients identified in Table 3 to the non-productive formulations, and the quantities reported in Table 3 are in phr.

The productive rubber formulations were subsequently cured and tested for physical properties. The cured rubber formulations were determined to have the original and oven aged cure characteristics and physical properties delineated, as well, in Table 3. All example formulations tested showed acceptable physical properties for viscosity, elongation, modulus, rolling resistance factor, and tear strength. Examples 9 through 11 are formulations according to the disclosure, while example 8 did not include EPDM elastomer. Comparing examples 9 through 11 shows significant improvement in abrasion resistance over example 8, similar to the improvement described above. Examples 9 through 11 showed no cracking even after 168 hrs of ozone exposure (50 pphm, 25%, 40 deg C.) in accordance with ASTM D1149, while example 8 failed after only 48 hrs with heavy cracking (D1).

TABLE 3

| Ingredient | Ex. 8 | Ex. 9 | Ex. 10 | Ex. 11 |
|---|---|---|---|---|
| Non-Productive Blend | | | | |
| Budene 1207 | 40 | 20 | 20 | 20 |
| Natural Rubber | 60 | 50 | 50 | 50 |
| Royalene 509 | 0 | 30 | 30 | 30 |
| N330 Carbon Black | 35 | 32.5 | 32.5 | 32.5 |
| N550 Carbon Black | 12 | 10 | 10 | 10 |
| Zinc oxide | 3 | 3 | 3 | 3 |
| 6PPD | 2 | 2 | 2 | 2 |
| TMQ | 1 | 1 | 1 | 1 |
| Stearic Acid | 2 | 2 | 2 | 2 |
| Paraffinic wax | 1.5 | 1.5 | 0 | 0.75 |

TABLE 3-continued

| Ingredient | Ex. 8 | Ex. 9 | Ex. 10 | Ex. 11 |
|---|---|---|---|---|
| Productive Blend | | | | |
| TBBS | 1.3 | 1.3 | 1.3 | 1.3 |
| PVI | 0.15 | 0.15 | 0.15 | 0.15 |
| Sulfur | 1.6 | 1.6 | 1.6 | 1.6 |
| PHR Running Total: | 159.55 | 155.05 | 153.55 | 154.3 |
| Test | | | | |
| Tensile (Mpa) | 23.6 | 20.7 | 20.7 | 20.6 |
| Elongation (%) | 471 | 481 | 471 | 482 |
| Mod 100 (Mpa) | 3.0 | 3.3 | 3.4 | 3.2 |
| Mod 200 (Mpa) | 7.5 | 7.3 | 7.5 | 7.0 |
| Mod 300 (Mpa) | 13.2 | 12.0 | 12.3 | 11.6 |
| Shore A Hardness | 63 | 67 | 67 | 67 |
| Die C Tear (N/mm) | 50.00 | 38.95 | 38.42 | 38.95 |
| DIN Abrasion (mm3) | 90 | 132 | 126 | 128 |
| Dynamic Ozone, 40 C., 50 PPHM, 25% | | | | |
| Hrs to Fail | 48 | 168 | 168 | 168 |
| Rating | D1 | 0 | 0 | 0 |
| RSA-G2 @ 1% Strain, 25 C., 10 Hz | | | | |
| E' (MPa) | 9.5 | 11.9 | 11.2 | 11.5 |
| Tan Delta | 0.1364 | 0.1317 | 0.1302 | 0.1344 |
| RRF | 0.0643 | 0.0577 | 0.0582 | 0.0596 |
| RRF Index | 100 | 90 | 91 | 93 |
| Rheometer @ 150 C. | | | | |
| Min | 4.582 | 4.647 | 5.003 | 4.932 |
| Max | 33.32 | 28.27 | 29.03 | 28.82 |
| T90 | 13.25 | 11.81 | 11.54 | 11.62 |
| Moony Scorch @ 121 C. | | | | |
| Initial | 39.22 | 43.7 | 51.05 | 45.27 |
| ML | 26.47 | 26.82 | 28.4 | 28.27 |

*RRF = Tan Delta/(E')$^{1/3}$

Figure 5:
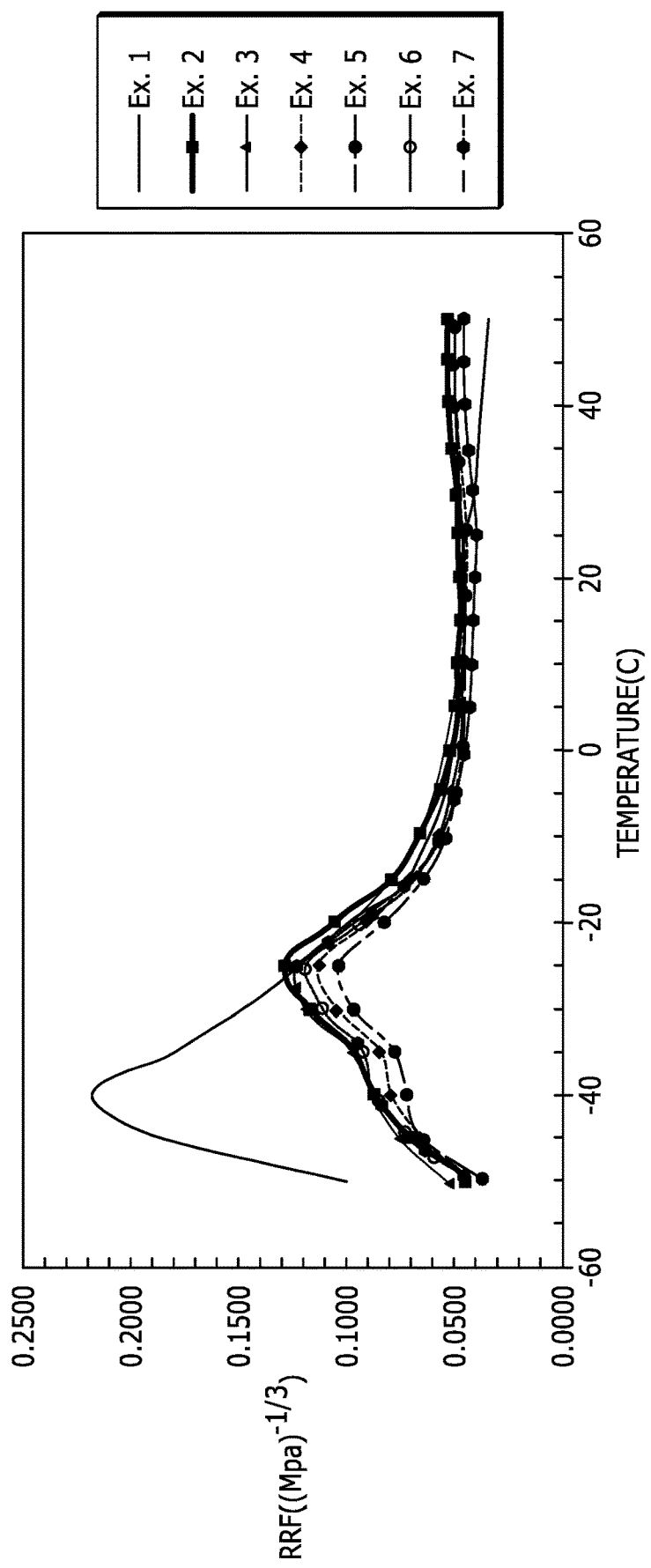

As can be seen by reviewing Tables 1 through 3, the working examples of the disclosure exhibited greatly improved abrasion resistance, dynamic ozone resistance as compared to the results determined for the controls (examples 1 and 8), while maintaining low rolling resistance properties. FIG. 5 is a plot of rolling resistance factor versus temperature of the cured rubber formulations evaluated in examples 1 through 7, where example 1 is a prior art control rubber formulation and examples 2 through 7 are formulations in accordance with the disclosure.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

LIST OF REFERENCE NUMERALS (PART OF THE SPECIFICATION)

10 Pipe conveyor belt
17 Inner cover layer
18 Outer cover layer
19 Body of the conveyor belt
20 Pipe conveyor belt system
22 Top of the system
23 Idler rolls
24 Bottom of the system
30 Overlap region
32 First longitudinal edge
34 Second longitudinal edge
36 Overlap region width
38 Overlap region centerline
40 First anti-rotation region
42 Second anti-rotation region
50 Load bearing region
60 Longitudinal reinforcement members
72 Fabric reinforcement layer
74 Fabric reinforcement layer
80 Diameter of the tube-like shape

What is claimed is:

1. A conveyor belt comprising an outer cover layer, an opposing inner cover layer, and a carcass layer disposed between the outer cover layer and the inner cover layer, wherein the outer cover layer comprises a sulfur cured rubber formulation comprising a blend of from 20 phr to 40 phr of an EPDM elastomer, from 1 phr to 40 phr of a polybutadiene rubber, from 30 phr to 80 phr of a natural rubber, and at least one of N330 carbon black or N220 carbon black incorporated in an amount of from 45 phr to 50 phr, and wherein after curing, the curable rubber formulation has a dynamic ozone resistance failure time of from 96 hours to 168 hours after exposure to conditions of 50 pphm ozone, 25% strain, and 104° F.

2. The conveyor belt according to claim 1, wherein the sulfur cured rubber formulation comprises a blend of from 25 phr to 35 phr of the EPDM elastomer, from 20 phr to 30 phr of the polybutadiene rubber, and from 40 phr to 50 phr of the natural rubber.

3. The conveyor belt according to claim 1, wherein the sulfur cured rubber formulation comprises a sulfur curative in an amount of from 1.0 phr to 4.0 phr.

4. The conveyor belt according to claim 1, wherein the sulfur cured rubber formulation comprises the sulfur curative in an amount of from 1.0 phr to 2.0 phr.

5. The conveyor belt according to claim 1, wherein the sulfur cured rubber formulation further comprises paraffinic wax in an amount of from 0.75 phr to 1.5 phr.

6. The conveyor belt according to claim 1, wherein the sulfur cured rubber formulation has a rolling resistance factor value of from 0.05 to 0.06 at a temperature of 25 deg C.

7. The conveyor belt according to claim 1, wherein the conveyor belt is a pipe conveyor belt.

8. A pipe conveyor belt comprising an outer cover layer, an opposing inner cover layer, and a carcass layer disposed between the outer cover layer and the inner cover layer, wherein the outer cover layer comprises a sulfur cured rubber formulation comprising a blend of from 25 phr to 35 phr of an EPDM elastomer, from 10 phr to 30 phr of a polybutadiene rubber, from 40 phr to 50 phr of a natural rubber, and at least one of N330 carbon black or N220 carbon black incorporated in an amount of from 45 phr to 50 phr, wherein the sulfur cured rubber formulation exhibits no cracking under dynamic ozone testing conditions of 50 pphm ozone, 25% strain, and 40 deg C., in accordance with ASTM D1149, wherein the sulfur cured rubber formulation has a rolling resistance factor value of from 0.05 to 0.06 at a temperature of 25 deg C. and wherein after curing, the curable rubber formulation has a dynamic ozone resistance failure time of from 96 hours to 168 hours after exposure to conditions of 50 pphm ozone, 25% strain, and 104° F.

9. The pipe conveyor belt according to claim 8, wherein the sulfur cured rubber formulation comprises a sulfur curative in an amount of from 1.0 phr to 4.0 phr.

10. The pipe conveyor belt according to claim 9, wherein the sulfur cured rubber formulation comprises the sulfur curative in an amount of from 1.0 phr to 2.0 phr.

11. The pipe conveyor belt according to claim 8, wherein the sulfur cured rubber formulation further comprises paraffinic wax in an amount of from 0.75 phr to 1.5 phr.

12. A curable rubber formulation comprising a blend of from 20 phr to 40 phr of an EPDM elastomer, from 10 phr to 40 phr of a polybutadiene rubber, from 30 phr to 60 phr of a natural rubber, a sulfur curative, and at least one of N330 carbon black or N220 carbon black incorporated in an amount of from 45 phr to 50 phr, wherein after curing, the curable rubber formulation has a dynamic ozone resistance failure time of from 96 hours to 168 hours after exposure to conditions of 50 pphm ozone, 25% strain, and 104° F.

13. The curable rubber formulation according to claim 12, wherein the formulation comprises a blend of from 25 phr to 35 phr of the EPDM elastomer, from 20 phr to 30 phr of the polybutadiene rubber, and from 40 phr to 50 phr of the natural rubber.

14. The curable rubber formulation according to claim 12, wherein the formulation comprises the sulfur curative in an amount of from 1.0 phr to 4.0 phr.

15. The curable rubber formulation according to claim 12, wherein the formulation further comprises paraffinic wax in an amount of from 0.75 phr to 1.5 phr.

16. The curable rubber formulation according to claim 12, wherein after being cured, the cured rubber formulation has a rolling resistance factor value of from 0.05 to 0.06 at a temperature of 25 deg C.

17. The curable rubber formulation according to claim 12, wherein the sulfur curative is comprised of a sulfur donor/accelerator.

18. The curable rubber formulation according to claim 12, wherein the sulfur curative is comprised of free sulfur.

* * * * *